(No Model.)

W. H. MYERS.
HARROW.

No. 288,100. Patented Nov. 6, 1883.

WITNESSES:
J. D. Garfield
C. Sedgwick

INVENTOR:
W. H. Myers
BY Munn & Co.
ATTORNEYS.

UNITED STATES PATENT OFFICE.

WILLIAM H. MYERS, OF OREGON, WISCONSIN.

HARROW.

SPECIFICATION forming part of Letters Patent No. 288,100, dated November 6, 1883.

Application filed March 16, 1883. (No model.)

*To all whom it may concern:*

Be it known that I, WILLIAM H. MYERS, of Oregon, Dane county, Wisconsin, have invented a new and Improved Harrow, of which the following is a full, clear, and exact description.

The object of my invention is to contrive a flexibly-jointed harrow that may be adapted for different kinds of work by the different forms in which the teeth may be set, as upright, or slanting either forward or backward, and so as to lie flat or nearly flat, to be used as a "blanket" or "planker" harrow for scraping, leveling, and clod-crushing, all as hereinafter fully described.

Reference is to be had to the accompanying drawings, forming part of this specification, in which similar letters of reference indicate corresponding parts in all the figures.

Figure 1:
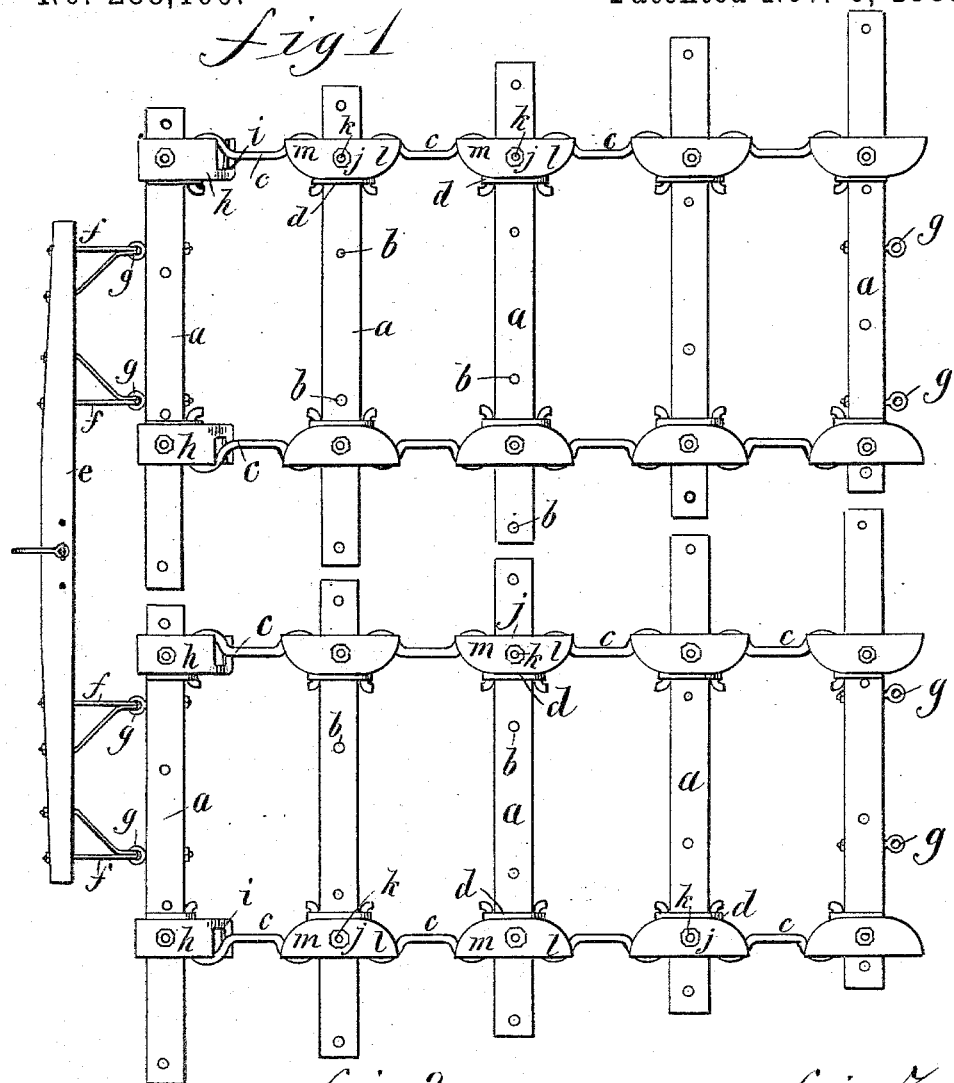
Figure 2:
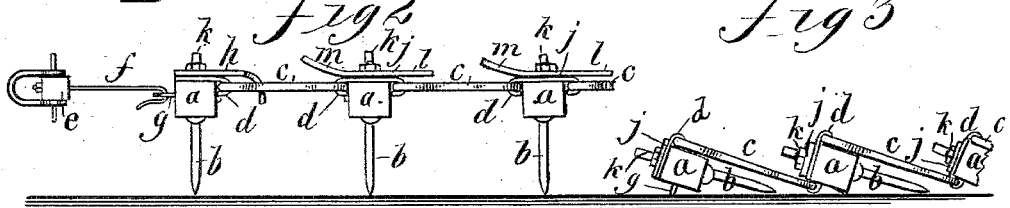
Figure 3:
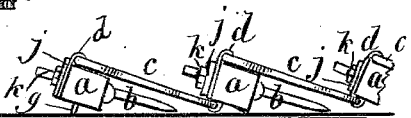

Figure 1 is a plan view of my improved harrow. Fig. 2 is a side elevation of it in the upright position; and Fig. 3 is a side view of a portion of it in the position for leveling, clod-crushing, and the like.

I prefer to use two series of bars, $a$, for holding the teeth $b$, the two series being placed side by side, and the bars of each series being arranged transversely to the line of the movement of the harrow at suitable distances apart, and connected by rods $c$, that are hinge-jointed with the bars $a$ by means of plates $d$, fitted on the top of the bars and extending from side to side, for connecting with the rods of both sides of the bars, and the two series of bars being connected to the stretcher-sweep $e$ by the braced hooks $f$ and eyes $g$, which keep them the proper distance apart, and to which the team is hitched.

The front bars, to which the stretcher-sweep $e$ is connected, have hook-plates $h$, bolted on the top and engaging the rods $c$ back of the joints of the said rods with the said bars, to make said joints rigid when the teeth are required to stand upright, as in Figs. 1 and 2, and the rest of the bars back of the front ones have plates $j$, bolted on at the middle by the same bolt, $k$, that secures the hinge-plate $d$. From the center these plates are straight to the end $l$ at one side of the bolt, and they are bent upward at the other side to the end $m$. When bolted on cross-wires of the bars $a$, as in Fig. 1, with the straight end $l$ rearward and projecting over the connecting-rods $c$, the teeth will be made to work upright, as represented in Figs. 1 and 2. With the bent end $m$ turned backward, the teeth will incline backward from the top downward. With the plates turned over, so that the bent ends $m$ incline downward, the teeth will be made to incline forward from the top downward, to operate like cultivators, and with the plates turned lengthwise of the bars, as in Fig. 3, and the hook-plates $h$ being disconnected from the rods $c$, the teeth will lie nearly flat on the ground for smoothing and leveling the ground and crushing clods. I also have the hind bars, $a$, provided with eye-studs $g$, so that with the plates $j$ arranged as in Figs. 1 and 2 the teeth will work upright when the stretcher is hitched on as shown in the drawings, and they will pitch backward if the stretcher be hooked on at the other side, thus saving the trouble of shifting the plates for these two conditions of the teeth, which are the most frequently required.

Having thus described my invention, I claim as new and desire to secure by Letters Patent—

The plates $j$, having one straight part, $l$, and one bent part, $m$, in combination with bars $a$, connecting-rods $c$, and plates $d$, and being adjustable and reversible on said bars $a$, substantially as described.

WILLIAM H. MYERS.

Witnesses:
   GEO. W. GETS,
   MORRIS GETTS.